United States Patent

Ohtaka et al.

[11] Patent Number: 5,712,035
[45] Date of Patent: Jan. 27, 1998

[54] LIQUID CURABLE RESIN COMPOSITION

[75] Inventors: Tohru Ohtaka, Kawasaki; Shinichirou Iwanaga, Yokkaichi; Tsuyoshi Watanabe; Katutoshi Igarashi, both of Yokohama, all of Japan

[73] Assignee: DSM N.V., Heerlan, Netherlands

[21] Appl. No.: 603,681

[22] PCT Filed: Mar. 9, 1993

[86] PCT No.: PCT/US93/02037
§ 371 Date: Feb. 17, 1995
§ 102(e) Date: Feb. 17, 1995

[87] PCT Pub. No.: WO93/21248
PCT Pub. Date: Oct. 28, 1993

Related U.S. Application Data

[63] Continuation of Ser. No. 318,874, filed as PCT/US93/02037, Mar. 9, 1993, abandoned.

[30] Foreign Application Priority Data

Apr. 20, 1992 [JP] Japan ......... 4-99595

[51] Int. Cl.$^6$ ......... C08G 18/04
[52] U.S. Cl. ......... 428/378; 528/49; 528/75; 528/76; 528/79; 522/97; 526/301; 525/455; 385/128; 428/903; 428/500
[58] Field of Search ......... 528/49, 75, 76, 528/79; 522/97; 526/301; 525/455; 385/128; 428/378, 500, 903

[56] References Cited

U.S. PATENT DOCUMENTS 4,507,458 3/1985 Shiraki ......... 528/49
4,844,604 7/1989 Bishop et al. ......... 522/97

Primary Examiner—Rachel Gorr
Attorney, Agent, or Firm—Cushman Darby & Cushman Intellectual Property Group of Pillsbury Madison & Sutro, LLP

[57] ABSTRACT

Provided is an optical fiber having a primary coating thereon wherein the coating is formulated from an ultra-violet light curable resin composition containing:

(A) a polyether polyol compound containing, as structural units, groups represented by the following formulas (1), (2, and (3), (1) —$CH_2CH_2O$—

(2) —$CH_2CH(R)O$—, and (3) one or more groups selected from groups (a), (b), and (c) below, —$CH_2CH_2CH_2CH_2O$—      (a)

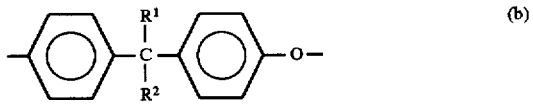

(b)

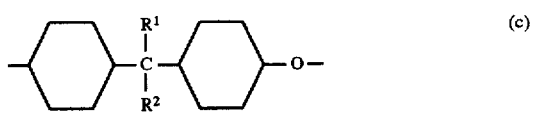

(c)

wherein R represents an alkyl group containing two or more carbon atoms, and $R^1$ and $R^2$ are independently selected from a hydrogen atom or a methyl group;

(B) a polyisocyanate compound; and (C) a (meth)acrylate compound having a hydroxy group.

25 Claims, No Drawings

LIQUID CURABLE RESIN COMPOSITION

This is a continuation of application Ser. No. 08/318,874, filed Feb. 17, 1995, abandoned; which is a National U.S. application of PCT/US 93/02037, filed Mar. 9, 1993 and claims priority of Japanese Patent Application No. 99595/04, filed Apr. 20, 1992.

FIELD OF THE INVENTION

The present invention relates to a liquid curable resin composition which has superior curing characteristics, durability, and the like, adheres well to various types of substrates, and is therefore useful as a coating material for plastics, wood, porcelain, glass, paper, and the like, and as an optical molding material, three-dimensional molding material, printing plate material, and the like.

DESCRIPTION OF THE PRIOR ART

Generally, an optical fiber is provided with a resin coating comprising a flexible primary coating layer on the surface of the optical fiber, with the object of protecting and reinforcing the bare optical fiber threads immediately after hot melt spinning of the glass fiber, the outside of which is covered in turn by a secondary coating layer. The coating material used to form these coatings must have the following characteristics:

(1) be a liquid at room temperature and have high processability;
(2) provide good productivity at a high curing rate;
(3) show superior flexibility;
(4) exhibit very little physical change during a wide range of temperature changes;
(5) have superior thermal resistance and superior resistance to hydrolysis;
(6) show superior long term reliability with little physical changes over time;
(7) show superior resistance to chemicals such as acids and alkalis;
(8) exhibit low moisture and water absorption; and
(9) exhibit superior light resistance.

To meet these requirements various liquid coating materials of the radiation curable type have been developed. They are compositions containing urethane acrylate using, for example, tetrahydrofuranethylene oxide ring opening copolymers (Japanese patent Laid-open (ko-kai) No. 86450/1986), tetrahydrofuranpropylene oxide ring opening copolymer (Japanese Patent Laid-open (ko-kai) No. 181170/1985), or tetrahydrofuranalkyltetrahydrOfuran copolymers (Japanese Patent Laid-open (ko-kai) No. 115964/1989).

Compositions in which these polyether copolymers are used have drawbacks still to be solved. That is, urethane acrylates using these polyether copolymers are insufficient in one or more of the characteristics, including resistance to ultraviolet light, heat resistance, light resistance (resistance against changing its color into yellow under light radiation), heat resistance (resistance against changing its color into yellow when heated), and flexibility.

Accordingly, an object of the present invention is to provide, with due consideration to the drawbacks of such conventional compositions, a liquid curable resin composition ideal as a covering material for optical fiber, which has a low viscosity at room temperature and exhibits good processability when used to cover optical fibers, has good optical curing characteristics, can accommodate high speed optical fiber production, and in the cured state shows excellent flexibility, good resistance to heat, ultraviolet light, and oil, and exhibits suitable adherence to optical fiber.

SUMMARY OF THE INVENTION

This object is achieved in the present invention by the provision of a liquid curable resin composition comprising a urethane (meth)acrylate obtained by the reaction of:

(A) a polyether polyol compound containing, as a structural units, groups represented by the following formulae (1), (2), and (3), (1) —$CH_2CH_2O$—
(2) —$CH_2CH(R)O$—, and
(3) one or more groups selected from groups (a), (b), and (c) below,

  (a)

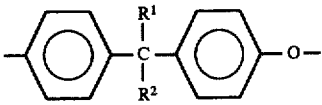  (b)

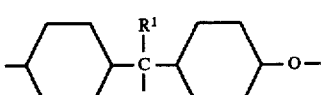  (c)

wherein R represents an alkyl group containing two or more carbon atoms, and $R^1$ and $R^2$ are independently selected from a hydrogen atom or a methyl group;

(B) a polyisocyanate compound; and
(C) a (meth)acrylate compound having a hydroxy group. The livid curable resin composition of the present invention has an extremely low Young's modulus at room temperature, shows a suitable adhering strength to glass fiber, has superior durability, exhibits high speed curing performance, and is thus suitable as a coating material for optical fiber.

DETAILED DESCRIPTION OF THE INVENTION AND PREFERRED EMBODIMENTS

A polyether polyol compound (hereinafter referred to as polyol compound (A)) used in the present invention must contain structural units of the above formulae (1), (2), and (3). There are no limitations as to the manner in which these structural units are polymerized. They may be polymerized by random, block, or graft polymerization.

Such a polyol compound (A) can be prepared by the ring-opening polymerization of ethylene oxide, 1,2-alkylene oxides with 4 or more carbon atoms, e.g., 1,2-butylene oxide, 1,2-hexene oxide, or the like, and one or more compounds selected from polytetramethylene glycol, bisphenol A, and bisphenol F, by a known method.

The proportion of structural unit (1) contained in polyol compound (A) is 5 to 50% by weight, and preferably 10 to 45%. If the amount of the structural unit (1) is less than 5%, improvement in the oil resistance of the composition after curing is insufficient; if greater than 50%, water resistance and flexibility of the composition after curing tend to be lowered. A preferable proportion of structural unit (2) is 10 to 90%, with a particularly preferable range being 20 to 80%. The proportion of structural unit (3) is preferably 5 to 85%, and more preferably 10 to 70%.

The number of carbon atoms of R in the unit of formula (2) contained in (meth)acrylate (A) is preferably 2 to 12, with a particularly preferable range being 2 to 4.

The number average molecular weight of the polyol compound (A) is usually in a range of 200 to 10,000, and preferably 500 to 8,000. If the number average molecular weight is less than 200, the Young's modulus of the cured material at room temperature or at lower temperatures increases, and there is a tendency toward an increase in transmission losses from side pressure when it is applied to optical fiber; if greater than 10,000, the viscosity of the resulting composition tends to increase, resulting in impaired coating performance of the composition when it is coated onto the optical fiber.

The polyol compound (A) may contain any structural units other than the above structural units of the formulae (1) to (3), to the extent that the effects of the present invention are not affected, so long as polyol compound (A) contains all of these 3 structural units. Examples of such other structural units include —$CH_2CH_2CH_2O$—, —$CH_2CH(CH_3)O$—, and the like.

In addition, polyols which do not have the above structural units (1), (2) and (3) can be used in combination. Examples of such polyols include polyether polyols, polyester polyols, polycarbonate polyols, polycapralactone polyols, and other polyols.

Examples of polyether polyols which do not have the above structural units (1), (2) and (3) include, for example, polyethylene glycol, 1,2-polypropylene glycol, 1,3-polypropylene glycol, 1,2-polybutylene glycol, polyisobutylene glycol, propylene oxide-tetrahydrofuran copolymers, methyl tetrahydrofuran-tetrahydrofuran copolymers, and the like.

Examples which can be given of polyester polyols include polyester polyols obtained by reacting a polyvalent alcohol such as ethylene glycol, polyethylene glycol, propylene glycol, polypropylene glycol, tetramethylene glycol, polytetramethylene glycol, 1,6-hexane diol, neopentyl glycol, 1,4-cyclohexanedimethanol, 3-methyl-1,5-pentanediol, 1,9-nonanediol, 2-methyl-1,8-octanediol, or the like with a polybasic acid such as phthalic acid, isophthalic acid, terephthalic acid, maleic acid, fumaric acid, adipic acid, sebacic acid, or the like; and commercial products such as Kurapol P-2010, PMIPA, PRA-A, PHA-A2, PNA2000 (manufactured by Kuraray Co.), and the like.

Examples which can be given of polycarbonate polyols include 1,6-hexanepolycarbonate and products available on the market, such as DN-980, DN-981, DN-982, DN-983 (manufactured by Nihon Polyurethane Co., Ltd.), PC-8000 (manufactured by PPG of the US), and the like.

Examples of polycaprolactone polyols include polycaprolactonediols obtained by reacting Σ-caprolactone with a divalent diol such as ethylene glycol, polyethylene glycol, propylene glycol, polypropylene glycol, tetramethylene glycol, polytetramethylene glycol, 1,2-polybutylene glycol, 1,6-hexanediol, neopentyl glycol, 1,4-butanediol, or the like, as well as PLACCEL-205, 205AL, 212, 212AL, 220, 220AL (manufactured by Daicel Co.), and the like.

Examples of other polyols include ethylene glycol, propylene glycol, 1,4-butanediol, 1,5-pentanediol, 1,6-hexanediol, neopentyl glycol, 1,4-cyclohexanedimethanol, ethylene oxide and/or propylene oxide-addition diols to bisphenol-A, ethylene oxide and/or propylene oxide-addition diols to bisphenol-F, ethylene oxide and/or propylene oxide-addition diols to hydrogenated bisphenol-A, ethylene oxide and/or propylene oxide-addition diols to hydrogenated bisphenol-F, dimethylol compounds of dicyclopentadiene, tricyclodecanedimethanol, poly-β-methyl-d-valerolactone polyol with a terminal hydroxy group, polybutadiene with a terminal hydroxy group, hydrogenated polybutadiene with a terminal hydroxy group, castor oil-modified polyols, polydimethylsiloxane with a diol terminal group, polydimethylsiloxane carbitol-modified polyols, and the like.

The number average molecular weight of these polyols is usually 200 to 10,000, and preferably 500 to 8,000.

Given as examples of polyisocyanate compound (B) which can be used in the present invention are 2,4-tolylene diisocyanate, 2,6-tolylene diisocyanate, 1,3-xylylene diisocyanate, 1,4-xylylene diisocyanate, 1,5-naphthalene diisocyanate, m-phenylene diisocyanate, p-phenylene diisocyanate, 3,3'-dimethyl-4,4'-diphenylmethane diisocyanate, 4,4'-diphenylmethane diisocyanate, 3,3'-dimethylphenylene diisocyanate, 4,4'-biphenylene diisocyanate, 1,6-hexane diisocyanate, isophorone diisocyanate, methylenebis(4-cyclohexyl isocyanate), 2,2,4-trimethylhexamethylene diisocyanate, bis(2-isocyanateethyl)fumarate, 6-isopropyl-1,3-phenyl diisocyanate, 2,2-bis(4'-isocyanic acid)propane, lysine diisocyanate, and the like. Of these particularly preferable are 2,4-tolylene diisocyanate, isophorone diisocyanate, 2,2,4-trimethylhexamethylene diisocyanate, and the like.

Examples of (meth)acrylates with a hydroxyl group, component (C) used in the present invention, include 2-hydroxyethyl (meth)acrylate, 2-hydroxypropyl (meth) acrylate, 2-hydroxybutyl (meth)acrylate, 2-hydroxy-3-phenyloxypropyl(meth)acrylate, 1,4-butanediol mono (meth)acrylate, 2-hydroxyalkyl(meth)acryloyl phosphate, 4-hydroxycyclohexyl(meth)acrylate, 1,6-hexanediol mono (meth)acrylate, neopentylglycol mono(meth)acrylate, trimethylolpropane di(meth)acrylate, trimethylolethane di(meth) acrylate, pentaerythritol tri(meth)acrylate, dipentaerythritol penta(meth)acrylate, (meth)acrylates represented by the following formula (4), $$CH_2=C(R^1)-COOCH_2CH_2-$$
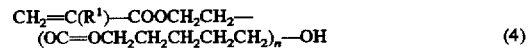
$$(OC=OCH_2CH_2CH_2CH_2CH_2)_n-OH \qquad (4)$$

wherein $R^1$ is a hydrogen atom or a methyl group and n is an integer from 1 to 15, preferably 1 to 4.

In addition, compounds obtained by an addition reaction between compounds containing a glycidyl group, such as, alkyl glycidyl ether, allyl glycidyl ether, glycidyl (meth) acrylate, or the like, and (meth)acrylic acid can be used. Among these, particularly desirable are 2-hydroxyethyl (meth)acrylate, 2-hydroxypropyl (meth)acrylate, and the like.

The urethane (meth)acrylates used in the present invention can be prepared by the reaction of the abovementioned polyol compound (A), polyisocyanate compound (B), and (meth)acrylate compound containing a hydroxy group (C); specifically, by reacting the isocyanate group in the polyisocyanate compound (B) with the hydroxy group of polyol compound (A) and the hydroxy group of the (meth)acrylate compound (C). The reaction can be carried out, for example, by the following manners.

(1) All of polyol compound (A), polyisocyanate compound (B), and (meth)acrylate compound containing a hydroxy group (C) are charged in the reactor for the reaction.

(2) Polyol compound (A) and polyisocyanate compound (B) are first reacted, and then the resulting reaction product is reacted with (meth)acrylate compound containing a hydroxy group (C).

(3) Polyisocyanate compound (B) and (meth)acrylate compound containing a hydroxy group (C) are first reacted, and then the resulting reaction product is reacted with polyol compound (A).

(4) Polyisocyanate compound (B) and (meth)acrylate compound containing a hydroxy group (C) are first reacted, then with polyol compound (A), and the resulting reaction product is finally reacted again with (meth)acrylate compound containing a hydroxy group (C).

The proportions of polyol compound (A), polyisocyanate compound (B), and (meth)acrylate compound containing a hydroxy group (C) used for the reaction are such that 1.1 to 3 equivalents of isocyanate groups in polyisocyanate compound (B) and 0.1 to 1.5 equivalents of hydroxy groups in (meth)acrylate compound containing a hydroxy group (C) are used for 1 equivalent of the hydroxy group contained in polyol compound (A).

In the reaction of these compounds, 0.01 to 1.0 parts by weight of a urethanization catalyst such as copper naphthenate, cobalt naphthenate, zinc naphthenate, n-butyltindilaurate, triethylamine, triethylenediamine, 2-methyltriethylenediamine, or the like, is used usually to 100 parts by weight of the total reactants used in these reactions. The reaction temperature is normally 10° to 90° C., and preferably 30° to 80° C.

The amount of urethane (meth)acrylate thus obtained used in the composition of the present invention is preferably 5 to 93%, but 20 to 87% is considered ideal in maintaining the coating characteristics when covering the optical fiber wire, and in maintaining the flexibility and long term reliability of the coated material after curing.

The molecular weight of urethane (meth)acrylate is usually 700 to 20,000, and preferably 1,000 to 10,000 (number average molecular weight).

To the liquid curable composition of the present invention, radiation curable compounds other than urethane (meth)acrylates, reaction diluents, and other additives may optionally be incorporated to the extent that the effects of the present invention are not adversely affected.

Other radiation curable compounds than the urethane (meth)acrylates of the present invention such as other urethane (meth)acrylates, polyester (meth)acrylates, epoxy (meth)acrylates, polyamide (meth)acrylates, polysiloxanes with (meth)acryloyloxy group, and the like can be incorporated in the compositions of the present invention. They may be added either singly or two or more may be added together.

Examples of reaction diluents include monofunctional and polyfunctional compounds. Specific examples of monofunctional compounds which can be given include 2-hydroxyethyl (meth)acrylate, 2-hydroxypropyl (meth) acrylate, 2-hydroxybutyl (meth)acrylate, methyl (meth) acrylate, ethyl (meth)acrylate, propyl (meth)acrylate, isopropyl (meth)acrylate, butyl (meth)acrylate, amyl (meth) acrylate, isobutyl (meth)acrylate, t-butyl (meth)acrylate, pentyl (meth)acrylate, isoamyl (meth)acrylate, hexyl (meth) acrylate, heptyl (meth)acrylate, octyl (meth)acrylate, isooctyl (meth)acrylate, 2-ethylhexyl (meth)acrylate, nonyl (meth)acrylate, decyl (meth)acrylate, isodecyl (meth) acrylate, undecyl (meth)acrylate, dodecyl (meth)acrylate, lauryl (meth)acrylate, octadecyl (meth)acrylate, stearyl (meth)acrylate, tetrahydrofurfuryl (meth)acrylate, butoxyethyl (meth)acrylate, ethoxydiethylene glycol (meth) acrylate, benzyl (meth)acrylate, cyclohexyl (meth)acrylate, phenoxyethyl (meth)acrylate, polyethylene glycol mono (meth)acrylate, polypropylene glycol mono(meth)acrylate, methoxyethylene glycol (meth)acrylate, ethoxyethoxyethyl (meth)acrylate, methoxypolyethylene glycol (meth)acrylate, methoxypolypropylene glycol (meth)acrylate, dicyclopentadiene (meth)acrylate, dicyclopentanyl (meth)acrylate, dicyclopentenyl (meth)acrylate, tricyclodecanyl (meth)acrylate, isobornyl (meth)acrylate, bornyl (meth)acrylate, diacetone (meth)acrylamide, isobutoxymethyl (meth) acrylamide, N-vinyl pyrrolidone, N-vinyl caprolactam, N,N-dimethyl (meth)acrylamide, t-octyl (meth)acrylamide, dimethylaminoethyl (meth)acrylate, diethylaminoethyl (meth)acrylate, 7-amino-3,7-dimethyloctyl (meth)acrylate, N,N-diethyl (meth)acrylamide, N,N'-dimethylaminopropyl (meth) acrylamide, (meth)acryloylmorphorine; vinyl ethers such as hydroxybutyl vinyl ether, lauryl vinyl ether, cetyl vinyl ether, 2-ethylhexyl vinyl ether, and the like; maleic acid esters, fumaric acid esters, and compounds represented by the following formulas (5) to (7).

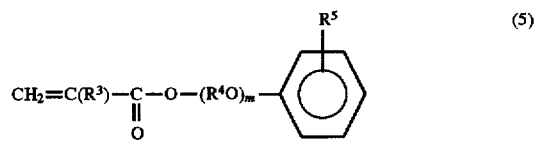

wherein $R^3$ indicates a hydrogen atom or a methyl group; $R^4$ is an alkylene group with 2 to 6, preferably 2 to 4, carbon atoms; $R^5$ is a hydrogen atom or an alkyl group with 1 to 12, preferably 1 to 9, carbon atoms; and m is an integer from 0 to 12, preferably from 1 to 8.

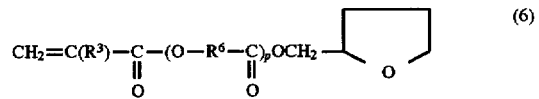

wherein $R^3$ is the same as above, and $R^6$ is an alkylene group with 2 to 8, preferably 2 to 5, carbon atoms, and p is an integer from 1 to 8, preferably from 1 to 4.

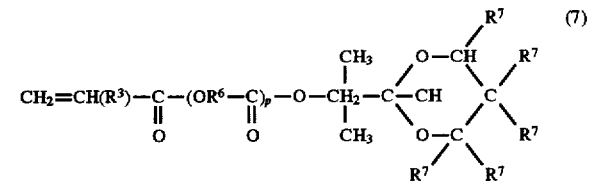

wherein $R^3$, $R^6$, and p are the same as above, $R^7$ is a hydrogen atom or a methyl group.

Examples of commercial products which can be used are ARONIX M111, M113, M114, M117 (manufactured by Toa Gosei Chemical Co.), KAYARAD TC110S, R629, R644 (manufactured by Nippon Kayaku Co.) and OISCOAT 3700 (manufactured by Osaka Organic Chemicals Co.) and the like.

Examples of polyfunctional compounds include trimethylolpropane tri(meth)acrylate, pentaerythritol tri(meth) acrylate, ethylene glycol di(meth)acrylate, tetraethylene glycol di(meth)acrylate, polyethylene glycol di(meth)acrylate, 1,4-butanediol di(meth)acrylate, 1,6-hexanediol di(meth) acrylate, neopentyl glycol di(meth)acrylate, trimethylolpropanetrioxyethyl (meth)acrylate, tris(2-hydroxyethyl) isocyanurate tri(meth)acrylate, tris(2-hydroxyethyl) isocyanurate di(meth)acrylate, tricyclodecanedimethanol di(meth)acrylate, epoxy (meth)acrylates obtained by the addition of a (meth)acrylate to bisphenol A diglycidyl ether, triethylene glycol divinyl ether, epoxy compounds, cyclic epoxy compounds, vinyl sulfides, vinyl urethanes, vinyl ureas, and the like.

Examples of commercial products which can be used are COPIMA-UV, SA1002, SA2007 (manufactured by Mitsubishi Petrochemical Co.), BISCOAT 700 (manufactured by Osaka Organic Chemical Co.), R604, DPCA-20, DPCA-30, DPCA-60, DPCA-120, HX-620, D-310, D-330 (manufactured by Nippon Kayaku Co.), ARONIX M210, M215, M315, M325, (manufactured by Toa Gosei Chemical Co.), and the like.

An appropriate reaction diluent can be used for a composition depending on the characteristics to be demanded of the composition.

When flexibility, especially flexibility at low temperatures, is required, (meth)acrylate compounds, of which the homopolymer have a glass transition temperature of −10° C. or below, are preferably used among the above-mentioned reaction diluents.

Given as preferable examples of such (meth)acrylate compounds are commercial products such as ARONIX M102, M111, M113, M114, M117 (manufactured by Toa Gosei Chemical Co.), KAYARAD TC110S, R629, R644 (manufactured by Nippon Kayaku Co.), and the like.

When good adhesion and curing characteristics are required, N-vinyl pyrrolidone and N-vinyl caprolactam among the above-mentioned reaction diluents are preferably used.

These reaction diluents can be incorporated in the composition of the present invention preferably in an amount of 5 to 60%, and particularly preferably 10 to 40%. The composition of the present invention is cured by heat and/or radiation. Radiation in this case means the application of infrared, visible light, and ultraviolet rays, as well as ionized rays such as X-rays, electron rays, α-rays, β-rays, τ-rays, and the like.

When the composition of the present invention is cured by heat, a radical polymerization initiator, for example, peroxides, azo compounds or the like, is generally used. Specific examples are benzoyl peroxide, t-butyloxybenzoate, azobisisobutyronitrile, and the like.

When the composition of the present invention is cured by light, a photopolymerization initiator, and, as required, a photosensitizing agent are used. Examples of photopolymerization initiators include 1-hydroxycyclohexyl phenyl ketone, 2,2-dimethoxy-2-phenylacetophenone, xanthone, fluorenone, benzaldehyde, fluorene, anthraquinone, triphenylamine, carbazole, 3-methylacetophenone, 4-chlorobenzophenone, 4,4'-dimethoxybenzophenone, 4,4'-diaminobenzophenone, Michler's ketone, benzoin propyl ether, benzoin ethyl ether, benzyldimethylketal, 1-(4-isopropyl-phenol)-2-hydroxy-2-methylpropane-1-on, 2-hydroxy-2-methyl-1-phenylpropane-1-on, thioxanthone, diethylthioxanthone, 2-isopropylthioxanthone, 2-chlorothioxanthone, 2-methyl-1-[4-(methylthio)phenyl]-2-morpholinopropane-1-on, 2,4,6-trimethylbenzoyldiphenylphosphine oxide, and commercial products such as Irugacure 184, 651, 500, 907, 369, CG24-61 (all manufactured by Ciba Geigy), Lucirine LR8728 (manufactured by 0ASF), Darocure 1116, 1173 (manufactured by Merck), Ubecryl-P36 (manufactured by UC0 Co.), and the like. Examples of photosensitization agents are triethylamine, diethylamine, N-methyldiethanolamine, ethanolamine, 4-dimethylaminobenzoic acid, 4-dimethylaminomethyl benzoate, 4-dimethylaminoethyl benzoate, 4-dimethylaminoisoamyl benzoate, and commercial products such as Ubecryl-P102, 103, 104, 105 manufactured by the UCB Co., and the like. These polymerization initiators and photosensitization agents can be added individually or in mixtures of two or more. In the case where the composition of the present invention is cured by both heat and ultraviolet light, the above-mentioned radical polymerization initiators can be used in combination.

The amount of polymerization initiator used is preferably 0.1 to 10% of the composition.

In addition, other additives may optionally be added to the composition of the present invention. Such additives include epoxy resins, polyamides, polyamidoimides, polyurethanes, polybutadienes, chloroprene, polyethers, polyesters, pentadiene derivatives, styrene/butadiene/styrene block copolymers, styrene/ethylene/butene/styrene block copolymers, styrene/isoprene/styrene block copolymers, petroleum resins, xylene resins, ketone resins, fluorine containing oligomers, silicone-type oligomers, polysulfide type oligomers, and the like.

Other types of additives which can be used as required in addition to those listed above include antioxidants, coloring agents, ultraviolet absorbers, photostabilizers, silane coupling agents, heat polymerization inhibitors, leveling agents, surfactants, preservatives, plasticizers, lubricants, solvents, fillers, aging inhibitors, wetting agents, coating surface improvers, and the like. Commercial antioxidants which can be used are Irganox 1010, 1035, 1076, 1222 (manufactured by Ciba Geigy), and the like. Given as examples of commercial absorbers are Tinuvin P234, 320, 326, 327, 328, 213 (manufactured by Ciba Geigy), Sumisorb 110, 130, 200 (Sumitomo Chemical Co.), and the like. Commercial photostabilizers which can be used include Tinuvin 292, 144, 622LD (manufactured by Ciba Geigy), Sanol LS7 70 (manufactured by Sankyo Chemical Co.), and the like. Examples of silane coupling agents which can be given are t-aminopropyltriethoxy silane, t-mercaptopropyltrimethoxy silane, t-methacryloxypropyltrimethoxy silane, and commercial products such as SH6062, 6030 (manufactured by Toray Silicone Co.), KBE903, 603, 403 (manufactured by Shin-Etsu Chemical Co.), and the like.

The liquid curable resin composition of the present invention can be manufactured by mixing the above components using commonly known methods.

The viscosity of the liquid curable resin composition of the present invention obtained in this manner is usually 200 to 20,000 cp at 25° C., and preferably 2,000 to 10,000 cp at 25° C.

When the composition of the present invention is used as a primary coating material for optical fiber, the Young's modulus after curing is 0.05 to 0.5 kg/mm$^2$, and particularly preferable is 0.06 to 0.13 kg/mm$^2$. The Young's modulus of the cured material at −40° to 60° C. is usually 0.01 to 10 kg/mm$^2$.

EXAMPLES

The present invention will now be explained with reference to the following examples, which are in no way limiting of the scope of the invention. In the examples below "parts" means "parts by weight".

Example 1

Preparation of urethane acrylate [A-1]

Into a reaction vessel equipped with a stirrer, 170.0 gm of isophorone diisocyanate, 1 gm of dibutyltindilaurate, and 0.3 gm of 2,6-di-tert-butyl-4-methyl phenol, as a polymerization inhibitor, were charged. Then, 59.2 gm of hydroxyethyl acrylate was added to the mixture while controlling the temperature below 20° C. After the addition, the mixture was stirred for 1 hour while maintaining the temperature at 10 to 20° C., followed by the addition of 1,020.8 gm of copolymer diol of ethylene oxide, 1,2-butylene oxide, and polytetramethylene glycol (1:5:4 by weight) with a number average molecular weight of 2,000, while controlling the temperature at 40° to 50° C. The mixture was stirred for a further 5 hours at 50° to 60° C. to complete the reaction, thus obtaining urethane acrylate [A-1] with a number average molecular weight of 4,900.

Example 2

Preparation of urethane acrylate [A-2]

Into a reaction vessel equipped with a stirrer, 168.2 gm of isophorone diisocyanate, 1,044.6 gm of copolymer of ethylene oxide, 1,2-butylene oxide, and bisphenol A (1:7:1 by weight) with a number average molecular weight of 2,052, and 0.3 gm of 2,6-di-tert-butyl-4-methyl phenol, as a polymerization inhibitor, were charged. After cooling the mixture to 15° C. in an ice-cooled bath, 1 gm of dibutyltindilaurate was added to initiate the reaction at 30 to 40° C. for 2 hours. After the addition of 47.2 gm of hydroxyethyl acrylate, the mixture was stirred for 5 hours at a temperature of 50° to 60° C. to obtain urethane acrylate [A-2] with a number average molecular weight of 6,140.

Example 3

Preparation of urethane acrylate [A-3]

Into a reaction vessel equipped with a stirrer, 100 gm ARONIX M113™ (manufactured by Toa Gosei Chemical Co.), 153.3 gm of isophorone diisocyanate, 1 gm of dibutyltindilaurate, and 0.3 gm of 2,6-di-tert-butyl-4-methyl phenol, as a polymerization inhibitor, were charged. Then, 1,056.6 gm of copolymer diol of ethylene oxide, 1,2-butylene oxide, and hydrogenated bisphenol A (47.1: 41.2: 11:8 by weight) with a number average molecular weight of 2,040 was added to the mixture while controlling the temperature at 40° to 50° C. After the addition, the mixture was reacted for 2 hours. 40.1 gm of hydroxyethyl acrylate was added and the stirring was continued for a further 5 hours at 50° to 60° C. to complete the reaction, thus obtaining urethane acrylate [A-3] with a number average molecular weight of 7,240.

Example 4

Preparation of urethane acrylate [A-4]

Into a reaction vessel equipped with a stirrer, 331.1 gm of isophorone diisocyanate, 1 gm of dibutyltindilaurate, and 0.3 gm of 2,6-di-tert-butyl-4-methyl phenol, as a polymerization inhibitor, were charged. Then, 173.0 gm of hydroxyethyl acrylate was added to the mixture while controlling the temperature below 20° C. After the addition, the mixture was stirred for 1 hour while maintaining the temperature at 10° to 20° C., followed by the addition of 745.8 gm of polytetramethylene glycol with a number average molecular weight of 1,000, while controlling the temperature at 40° to 50° C. The mixture was stirred for a further 5 hours at 50° to 60° C. to complete the reaction, thus obtaining urethane acrylate [A-4] with a number average molecular weight of 1,680.

Example 5

Preparation of comparative urethane acrylate [B-1]

Into a reaction vessel equipped with a stirrer, 170.0 gm of isophorone diisocyanate, 1 gm of dibutyltindilaurate, and 0.3 gm of 2,6-di-tert-butyl-4-methyl phenol, as a polymerization inhibitor, were charged. Then, 59.2 gm of hydroxyethyl acrylate was added to the mixture while controlling the temperature below 20° C. After the addition, the mixture was stirred for 1 hour while maintaining the temperature at 10° to 20° C., followed by the addition of 1,020.8 gm of a copolymer diol of tetrahydrofuran and propylene oxide (3:7 by weight) with a number average molecular weight of 2,000 (PPTG 1000, manufactured by Hodogaya Chemical Co.) while controlling the temperature at 40° to 50° C. The mixture was stirred for a further 5 hours at 50° to 60° C. to complete the reaction, thus obtaining urethane acrylate [B-1] with a number average molecular weight of 4,900.

Example 6

Preparation of comparative urethane acrylate [B-2]

Into a reaction vessel equipped with a stirrer, 130.3 gm of 2,4-tolylene diisocyanate, 1 gm of dibutyltindilaurate, and 0.3 gm of 2,6-di-tert-butyl-4-methyl phenol, as a polymerization inhibitor, were charged. To the mixture was added 1070.0 gm of polytetramethylene glycol with a number average molecular weight of 2,000 (PPTG 2000, manufactured by Hodogaya Chemical Co.) was added while controlling the temperature at 40° to 50° C., followed by the reaction for 2 hours. Then, 49.6 gm of hydroxyethyl acrylate was added and the reaction was continued 5 hours at a temperature of 50 to 60° C. while stirring, thus obtaining urethane acrylate [B-2] with a number average molecular weight of 5,840.

Example 7

Into a reaction vessel equipped with a stirrer, 55 parts of urethane acrylate [A-1], 30 parts of ARONIX M113, as a reaction diluent, 7 parts of Kayarad TC110S (a product of Nippon Kayaku Co.), 5 parts of N-vinyl pyrrolidone, 1.5 parts of 2,4,6-trimethylbenzoyldiphenyl-phosphine oxide, 0.3 part of Irganox 1035 (manufactured by Ciba Geigy), 0.1 part of Sumisorb 110 (manufactured by Sumitomo Chemical Co.), as an absorber, 0.1 part of diethylamine, as a photosensitizing agent, and 1 part of silane coupling agent (SH 6062, manufactured by Toray Silicone Co.) were charged and mixed with stirring at 50° to 60° C. to obtain a transparent liquid composition with a viscosity of 3,700 cp at 25° C.

Example 8

Into a reaction vessel equipped with a stirrer, 55 parts of urethane acrylate [A-2], 25 parts of ARONIX M113, 12 parts of isobornyl acrylate, 5 parts of N-vinyl caprolactam, 1.5 parts of 2,4,6-trimethylbenzoyldiphenyl phosphine oxide, 0.3 part of Irganox 1035 (manufactured by Ciba Geigy), 0.1 part of diethylamine, and 1 part of SH 6062 were charged and mixed with stirring at 50° to 60° C. to obtain a transparent liquid composition with a viscosity of 3,000 cp at 25° C.

Example 9

Into a reaction vessel equipped with a stirrer, 60.5 parts of urethane acrylate [A-3], 37 parts of ARONIX MI13, 5 parts of N-vinyl pyrrolidone, 1.5 parts of 2,4,6-trimethylbenzoyldiphenylphosphine oxide, 0.3 part of Irganox 1035 (manufactured by Ciba Geigy), 0.1 part of diethylamine, and 1 part of SH 6062 were charged and mixed with stirring at 50° to 60° C. to obtain a transparent liquid composition with a viscosity of 5,000 cp at 25° C.

Example 10

Into a reaction vessel equipped with a stirrer, 60 parts of urethane acrylate [A-4], 20 parts of tricyclodecanedimethanol diacrylate, 10 parts of isobornyl acrylate, 10 parts of N-vinyl caprolactam, 1.5 parts of 2,4,6-trimethylbenzoyldiphenylphosphine oxide, and 0.3 part of Irganox 1035 (manufactured by Ciba Geigy) were charged and mixed with stirring at 50° to 60° C. to obtain a transparent liquid composition with a viscosity of 2,000 cp at 25° C.

Comparative Example 1

A composition was prepared in the same manner as in Example 7, except that 55 parts of the urethane acrylate [B-1] was used instead of the urethane acrylate [A-1]. A transparent liquid composition with a viscosity of 3,000 cp at 25° C. was obtained.

Comparative Example 2

A composition was prepared in the same manner as in Example 8, except that 30 parts of the urethane acrylate [B-2] was used instead of the urethane acrylate [A-2]. A transparent liquid composition with a viscosity of 11,000 cp at 25° C. was obtained.

Test Examples

1. Film Tests

Test leaves were prepared from compositions obtained in the above Examples and Comparative Examples and served to the evaluations according to the following methods.

(1) Preparation of test leaves

The liquid compositions were applied to glass plates using a 150 applicator to obtain cured films by irradiation with ultraviolet rays at 25 mJ/cm$^2$ or 500 mJ/cm$^2$. Next, the cured films were peeled from the glass plates and tempered for 24 hours at a temperature of 23° C. and 50% RH, to obtain the test leaves.

(2) Measurement of Young's modulus (conforming to JIS K7127 Standard)

The Young's modulus of each test leaf was measured in a tension tester at 23° C. or −40° C. at a drawing rate of 1 mm/min and a bench line interval of 25 mm.

(3) Gel Proportion

The initial weight (Wo) of the cured film was measured, then the film was extracted for 12 hours in a Soxhlet extraction flask using methyl ethyl ketone as a solvent.

After extraction, the film was dried in a vacuum drier at 50° C. for 12 hours, then after standing for one hour at room temperature the final weight (WI) was measured. The gel proportion was calculated using the following formula.

Gel proportion=W1/ Wo×100 (%)

(4) Weight Change

The weight of the cured films obtained by irradiation with ultraviolet light at 500 mJ/cm$^2$ was determined (initial weight: Wo). After the heat resistant and light resistant tests, the films were left for 1 hour at room temperature to determine its weight (dry weight: W1). The weight change was calculated according to the following formula.

Weight Change=(W 1−Wo)/Wo×100 (%)

(5) Heat Resistance Test

The cured films obtained by irradiation with ultraviolet light at 500 mJ/cm$^2$ were held in a thermostat at 120° C. for 15 days. The Young's modulus and gel proportion of the films were then measured. The results are shown in Table 1.

(6) Light Resistance Test

Light resistance tests were performed on the films cured at 500 mJ/cm$^2$ using a QUV weathering acceleration machine (manufactured by Q-panel Co.). The lamp used was a UV0-313. After 200 hours in the machine, the outer appearance of the film was examined and the Young's modulus and gel proportion were measured. The results are shown in Table 1.

TABLE 1

| Evaluation Item | Examples | | | Comparative Examples | |
|---|---|---|---|---|---|
| | 1 | 2 | 3 | 1 | 2 |
| Initial Evaluation [23° C.] | | | | | |
| Young's modulus (kg/mm$^2$) | | | | | |
| 25 m/cm$^2$ | 0.06 | 0.06 | 0.06 | 0.05 | 0.11 |
| 500 m/cm$^2$ | 0.07 | 0.06 | 0.06 | 0.08 | 0.18 |
| Gel proportion (%) | | | | | |
| 25 m/cm$^2$ | 88 | 90 | 88 | 82 | 85 |
| 500 m/cm$^2$ | 89 | 91 | 89 | 88 | 90 |
| After Heat Resistant Test 500 m/mm$^2$ | | | | | |
| Young's modulus (kg/mm$^2$) | 0.05 | 0.06 | 0.05 | 0.05 | 0.07 |
| Gel Proportion (%) | 86 | 87 | 86 | 82 | 65 |
| Color change into yellow | Non | Non | Non | Non | Changed |
| After Light Resistant Test 500 m/cm$^2$ | | | | | |
| Gel Proportion (%) | 84 | 83 | 83 | 50 | 83 |
| Weight Change | −0.3 | −0.1 | −0.2 | −10 | −1.5 |
| Color change into yellow | Non | Non | Non | Non | Changed |

2. Drawing Tests

Using an optical fiber drawing machine, two layers of a composition, according to the combination in Table 2, was applied to optical fibers and then cured by irradiation with ultraviolet rays to obtain coated optical fibers. The mean diameter of the optical fiber core was 125 μm, that of the fiber covered with the primary layer 200 μm, and that of the fiber covered with the secondary layer 250 μm.

The covered optical fibers were prepared at drawing speeds of 180, 360, and 720 m/min, and subjected to the tests according to the following methods. The results are shown in Table 2.

(1) Gel Proportion

The initial weight (Wo) of the coated fibers, cut to a length of 4 cm, was determined (initial weight: Wo), and the fibers were extracted for 12 hours in a Soxhlet extraction flask using methyl ethyl ketone as a solvent.

After extraction, the fibers were dried in a vacuum drier at 50° C. for 12 hours, then after standing for one hour at room temperature the final weight (dry weight: W1) was determined.

Thereafter, the optical fibers were calcined for 30 minutes in an electric furnace at 700° C. to remove the coated layers and to collect the optical fiber material, of which the weight (Wf) was determined.

The gel proportion was calculated using the following formula.

Gel proportion=(W 1−Wf)/(Wo−Wf)×100 (%)

3. Environment Test (1) Light Resistance

Coated optical fibers drawn at 360 m/min were exposed to fluorescent light (2,000 lux) for 30 days to evaluate their external appearance, and to determine the change in weight and the amount of hydrogen gas generated.

Method of Evaluation (a) External Appearance

Coated layers, fibers, and their interface were microscopically observed to investigate the presence or absence of vacant spaces, peeled portions, liquid drops, and foreign materials.

(b) Change in Weight

The change in weight by the exposure to fluorescent light was determined according to the following formula.

Change in Weight=(Wb−Wa)/(Wa−Wf)×100 (%)

wherein Wa is the weight of the coated fiber before exposure to fluorescent light, Wb after the exposure, and WE is the weight of the optical fiber obtained after removal of covered material by calcination in the an electric furnace at 700° C. for 30 minutes.

(c) Generation of Hydrogen Gas

The amounts of hydrogen gas before and after the light resistant test were determined by the following method. The coated optical fiber was accurately weighed, placed in a vial with a known weight, and heated at 100° C. for 4 hours. The air in the head space of the vial was collected by means of a gas tight syringe and the air was introduced to a gas chromatography to quantitatively analyze the amount of hydrogen gas. An absolute calibration curve was used for the analysis. The results are shown in Table 2.

TABLE 2

| Test Example No. | 1 | 2 | 3 | 4 | 5 |
|---|---|---|---|---|---|
| Soft material for primary layer | Example 1 | Example 2 | Example 3 | Comp. Example 1 | Comp. Example 2 |
| Hard material for secondary layer Results of Evaluation | Example 4 | Example 4 | Example 4 | Example 4 | Example 4 |
| 1. Curing Rate Gel Proportion (%) at Drawing Rate (m/min) | | | | | |
| 180 | 90 | 90 | 90 | 85 | 90 |
| 360 | 90 | 90 | 90 | 90 | 89 |
| 720 | 90 | 90 | 89 | 85 | 85 |
| 2. Environmental Test (Light Resistance) | | | | | |
| External Appearance | No change | No change | No change | No change | Changed |
| Weight Change (%) | −0.5 | −0.2 | −0.3 | −2.5 | −0.3 |
| Hydrogen Gas Generation (μl/gm) | | | | | |
| Initial | 0.2 | 0.2 | 0.2 | 0.2 | 8.0 |
| After Test | 5 | 6 | 4 | 300 | 20 |

The liquid curable resin composition of the present invention exhibits a high curing rate, its cured materials has a low Young's modulus and a high gel ratio, provides superior heat resistance and light resistance, and generates only a small amount of hydrogen gas. It is thus particularly suitable as a material for optical fiber coating. Because of its superior heat resistance, curability, and adherence, the composition is not only applicable to an optical fiber coating, but also useful as a protective coating material for various types of substrates such as metals, plastics, wood, porcelain, glass, and the like, and as an optical molding material, three-dimensional molding material, printing plate material, and the like.

What is claimed is:

1. An optical fiber having a primary coating thereon wherein the coating is formulated from an ultra-violet light curable resin composition comprising:

(A) a polyether polyol compound containing, as structural units, groups represented by the following formulas (1), (2), and (3), (1) —CH$_2$CH$_2$O—

(2) —CH$_2$CH(R)O—, and (3) one or more groups selected from groups (a), (b), and (c) below, —CH$_2$CH$_2$CH$_2$CH$_2$O— (a)

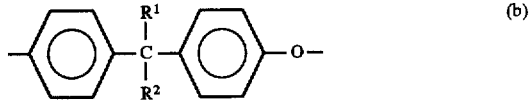
(b)

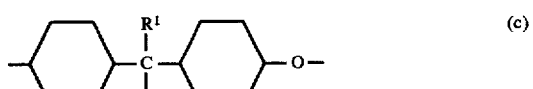
(c)

wherein R represents an alkyl group containing two or more carbon atoms, and R$^1$ and R$^2$ are independently selected from a hydrogen atom or a methyl group;

(B) a polyisocyanate compound; and (C) a (meth)acrylate compound having a hydroxy group, and wherein said coating, after curing, has a Young's modulus at 23° C. in a range of from about 0.06 kg/mm$^2$ to about 0.13 kg/mm$^2$.

2. A coated fiber as in claim 1 wherein the polyol is prepared by the ring-opening polymerization of ethylene oxide, 1,2-alkylene oxides with four or more carbon atoms and one or more compounds selected from polytetramethylene ether glycol, bisphenol A and bisphenol F.

3. A coated fiber as in claim 1 wherein the primary coating further comprises another polyol.

4. A coated fiber as in claim 1 wherein the primary coating further comprises at least one of polyether polyols, polyesterpolyols, polycarbonate polyols or polycaprolactone polyols.

5. A coated fiber as in claim 1 wherein the polyisocyanate compound is selected from 2,4-tolylene diisocyanate, isophorone diisocyanate or 2,2,4-trimethylhexane methylene diisocyanate.

6. A coated fiber as in claim 1 wherein the (meth)acrylate compound having a hydroxy group is 2-hydroxyethyl(meth)acrylate or 2-hydroxypropyl(meth)acrylate.

7. A coated fiber as in claim 1 wherein the primary coating further comprises N-vinyl pyrrolidone or N-vinyl caprolactam.

8. A coated fiber as in claim 1 wherein the primary coating further comprises a polymerization initiator.

9. An optical fiber having a primary coating thereon wherein the coating is formulated from an ultra-violet light curable resin composition comprising:

(A) a polyether polyol compound containing, as structural units, groups represented by the following formulas (1), (2), and (3), (1) —CH$_2$CH$_2$O—

(2) —CH$_2$CH(R)O—, and (3) one or more groups selected from groups (a), (b), and (c) below, —CH$_2$CH$_2$CH$_2$CH$_2$O— (a)

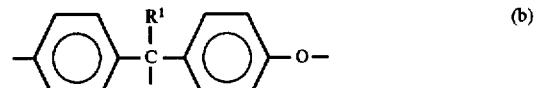
(b)

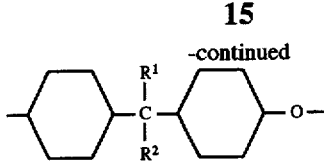 (c)

wherein R represents an alkyl group containing two or more carbon atoms, and R¹ and R² are independently selected from a hydrogen atom or a methyl group, and wherein said polyether polyol comprises:

5 to 50% by weight of said structural unit (1);
10 to 90% by weight of said structural unit (2); and
5 to 85% by weight of said structural unit (3), wherein said % by weight is based on the total weight of said polyether polyol;

(B) a polyisocyanate compound; and
(C) a (meth)acrylate compound having a hydroxy group.

10. A coated fiber according to claim 9, wherein said polyether polyol comprises:

10 to 45% by weight of said structural unit (1);
20 to 80% by weight of said structural unit (2); and
10 to 70% by weight of said structural unit (3), wherein said % by weight is based on the total weight of said polyether polyol.

11. A coated fiber according to claim 1, wherein said polyether polyol has a number average molecular weight of 200 to 10,000.

12. A coated fiber according to claim 1, wherein said polyether polyol has a number average molecular weight of 500 to 8,000.

13. A coated fiber according to claim 1, wherein said group R contains 2 to 12 carbon atoms.

14. A coated fiber according to claim 1, wherein said group R contains 2 to 4 carbon atoms.

15. An optical fiber having a primary coating thereon wherein the coating is formulated from an ultra-violet light curable resin composition comprising:

(A) a polyether polyol compound containing, as structural units, groups represented by the following formulas (1), (2), and (3),
(1) —CH₂CH₂O—
(2) —CH₂CH(R)O—, and
(3) one or more groups selected from groups (b), and (c) below,

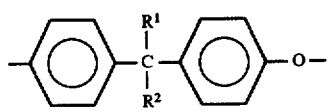 (b)

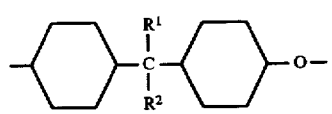 (c)

wherein R represents an alkyl group containing two or more carbon atoms, and R¹ and R² are independently selected from a hydrogen atom or a methyl group;

(B) a polyisocyanate compound; and
(C) a (meth)acrylate compound having a hydroxy group.

16. A coated fiber according to claim 15, wherein said polyether polyol comprises:

5 to 50% by weight of said structural unit (1);
10 to 90% by weight of said structural unit (2); and
5 to 85% by weight of said structural unit (3), wherein said % by weight is based on the total weight of said polyether polyol.

17. A coated fiber according to claim 15, wherein said polyether polyol comprises:

10 to 45% by weight of said structural unit (1);
20 to 80% by weight of said structural unit (2); and
10 to 70% by weight of said structural unit (3), wherein said % by weight is based on the total weight of said polyether polyol.

18. A coated fiber according to claim 15, wherein said polyether polyol has a number average molecular weight of 200 to 10,000.

19. A coated fiber according to claim 15, wherein said polyether polyol has a number average molecular weight of 500 to 8,000.

20. A coated fiber according to claim 15, wherein said group R contains 2 to 12 carbon atoms.

21. A coated fiber according to claim 15, wherein said group R contains 2 to 4 carbon atoms.

22. A substrate having a coating thereon wherein the coating is formulated from an ultra-violet light curable resin composition comprising:

(A) a polyether polyol compound containing, as structural units, groups represented by the following formulas (1), (2), and (3),
(1) —CH₂CH₂O—
(2) —CH₂CH(R)O—, and
(3) one or more groups selected from groups (b), and (c) below,

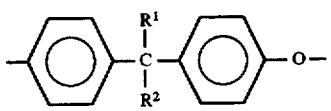 (b)

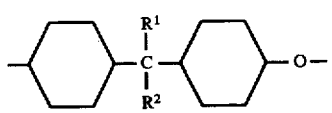 (c)

wherein R represents an alkyl group containing two or more carbon atoms, and R¹ and R² are independently selected from a hydrogen atom or a methyl group;

(B) a polyisocyanate compound; and
(C) a (meth)acrylate compound having a hydroxy group.

23. A coated substrate according to claim 22, wherein said polyether polyol comprises:

5 to 50% by weight of said structural unit (1);
10 to 90% by weight of said structural unit (2); and
5 to 85% by weight of said structural unit (3), wherein said % by weight is based on the total weight of said polyether polyol.

24. A coated substrate according to claim 22, wherein said group R contains 2 to 12 carbon atoms.

25. A coated substrate according to claim 22, wherein said substrate comprises plastic, wood, porcelain, glass or paper.

* * * * *